United States Patent [19]
Lee et al.

[11] Patent Number: 5,640,209
[45] Date of Patent: Jun. 17, 1997

[54] NTSC/PAL VIDEO SIGNAL CONVERSION APPARATUS EMPLOYING ITU-R BT.601 VIDEO SIGNAL

[75] Inventors: Jin Hwan Lee; Chie Teuk Ahn; Joo Hong Jeong; Sang Gyu Park, all of Daejeon, Rep. of Korea

[73] Assignee: Electronics and Telecommunications Research Institute, Rep. of Korea

[21] Appl. No.: 615,127

[22] Filed: Mar. 14, 1996

[51] Int. Cl.$^6$ ...................................................... H04N 7/01
[52] U.S. Cl. ............................................. 348/445; 348/454
[58] Field of Search ................................. 348/445, 454, 348/542–545, 714, 715, 718; H04N 2/01

[56] References Cited

U.S. PATENT DOCUMENTS

| | | | |
|---|---|---|---|
| 5,309,224 | 5/1994 | Usuki et al. | 348/443 |
| 5,325,179 | 6/1994 | Azar et al. | 348/454 |
| 5,534,949 | 7/1996 | Nakamura et al. | 348/525 |

OTHER PUBLICATIONS

The Evolution of Digital Audio and Video Format Conversions by Keith Y. Reynolds, pp. 644–647.

Primary Examiner—Victor R. Kostak
Attorney, Agent, or Firm—Blakely Sokoloff Taylor & Zafman

[57] ABSTRACT

An NTSC/PAL video signal conversion apparatus employing a ITU-R BT.601 video signal, comprising a timing reference signal decoder for detecting a timing reference signal from external input data in response to an external clock signal, a counting circuit for performing a plurality of counting operations in response to output signals from the timing reference signal decoder and the external clock signal, a write address generator for generating a write address, a write enable signal and a chip enable signal in response to output signals from the counting circuit, a read address generator for generating a read address, a read enable signal and a chip enable signal in response to the output signals from the counting circuit, a first multiplexer for selecting one of the write address from the write address generator and the read address from the read address generator in response to the external clock signal, a first D flip-flop for latching the external input data, a memory for storing output data from the first D flip-flop, a second D flip-flop for latching output data from the memory, a timing reference signal generator for decoding the output signals from the counting circuit, and a second multiplexer for multiplexing an output signal from the timing reference signal generator and output data from the second D flip-flop.

3 Claims, 1 Drawing Sheet

NTSC/PAL VIDEO SIGNAL CONVERSION APPARATUS EMPLOYING ITU-R BT.601 VIDEO SIGNAL

BACKGROUND OF THE INVENTION

1. Field of the Invention

The present invention relates in general to National Television System Committee (referred to hereinafter as NTSC) /Phase Alternating by Line (referred to hereinafter as PAL) video signal conversion, and more particularly to an NTSC/PAL video signal conversion apparatus for converting a international Telecommunication Union Recommendaion (referred to hereinafter as ITU-R) BT.601 video signal of the NTSC type into that of the PAL type, the ITU-R BT.601 video signal being a digital signal.

2. Description of the Prior Art

A conventional NTSC/PAL video signal conversion apparatus has employed an analog video signal. Namely, the conventional NTSC/PAL video signal conversion apparatus converts an analog composite video signal of the NTSC type into a digital composite video signal of the NTSC type. Then, the conventional NTSC/PAL video signal conversion apparatus converts the digital composite video signal of the NTSC type into that of the PAL type. Finally, the conventional NTSC/PAL video signal conversion apparatus converts the digital composite video signal of the PAL type into an analog composite video signal of the PAL type.

However, the above-mentioned conventional NTSC/PAL video signal conversion apparatus requires a high-performance analog/digital converter and a high-performance digital/analog converter for the NTSC/PAL video signal conversion, resulting in a complexity in hardware. Further, errors may be generated in process of analog/digital and digital/analog conversions.

SUMMARY OF THE INVENTION

Therefore, the present invention has been made in view of the above problem, and it is an object of the present invention to provide an NTSC/PAL video signal conversion apparatus in which an NTSC timing reference signal is detected from a ITU-R BT.601 video signal of the NTSC type, positions of active regions are found on the basis of the detected NTSC timing reference signal, line and frame counters are operated in response to the found active region positions, the ITU-R BT.601 video signal of the NTSC type is stored into a memory in a PAL manner in response to output signals from the line and frame counters, and a ITU-R BT.601 video signal of the PAL type is produced by reading the stored video signal from memory in the PAL manner in response to a PAL timing reference signal.

In accordance with the present invention, the above and other objects can be accomplished by a provision of an NTSC/PAL video signal conversion apparatus employing a ITU-R BT.601 video signal, comprising timing reference signal decoding means for detecting a timing reference signal from external input data in response to an external clock signal; counting means for performing a plurality of counting operations in response to output signals from the timing reference signal decoding means and the external clock signal; write address generation means for generating a write address, a write enable signal and a chip enable signal in response to output signals from the counting means; read address generation means for generating a read address, a read enable signal and a chip enable signal in response to the output signals from the counting means; first multiplexing means for selecting one of the write address from the write address generation means and the read address from the read address generation means in response to the external clock signal; first latch means for latching the external input data; memory means for storing output data from the first latch means in response to an output signal from the first multiplexing means, the write enable signal from the write address generation means, the read enable signal from the read address generation means and a signal obtained by ANDing the chip enable signal from the write address generation means and the chip enable signal from the read address generation means; second latch means for latching output data from the memory means; timing reference signal generation means for decoding the output signals from the counting means; and second multiplexing means for multiplexing an output signal from the timing reference signal generation means and output data from the second latch means and outputting the resultant signal externally.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
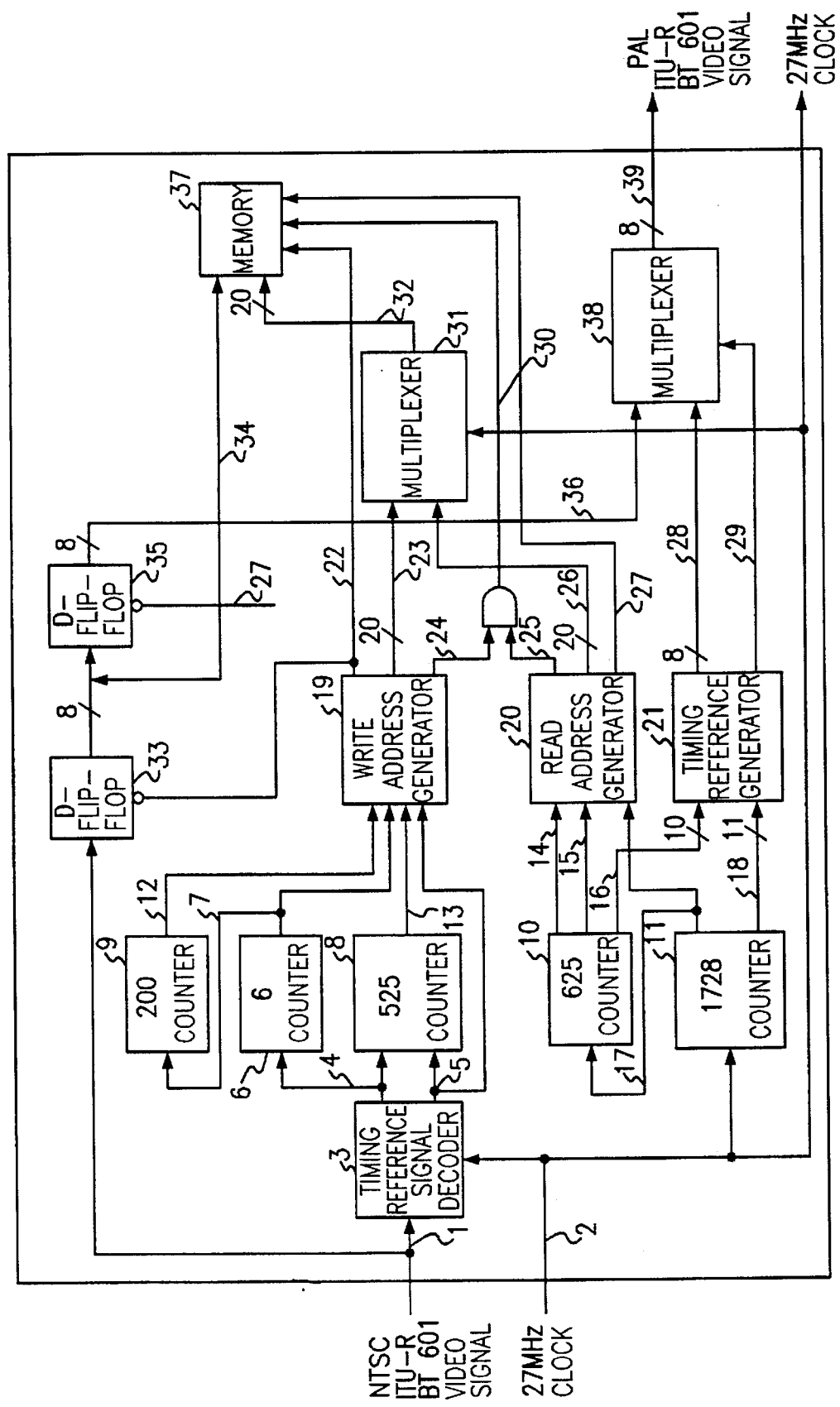
FIG. 1 is a block diagram illustrating an NTSC/PAL video signal conversion apparatus in accordance with the present invention.

Referring to FIG. 1, there is shown a block diagram of an NTSC/PAL video signal conversion apparatus in accordance with the present invention. In this drawing, the reference numeral 3 designates a timing reference signal decoder, the reference numeral 6 designates a 6 counter, the reference numeral 8 designates a 525 counter, the reference numeral 9 designates a 200 counter, the reference numeral 10 designates a 625 counter, the reference numeral 11 designates a 1728 counter, the reference numeral 19 designates a write address generator, the reference numeral 20 designates a read address generator, the reference numeral 21 designates a timing reference signal generator, the reference numeral 31 designates a first multiplexer, the reference numerals 33 and 35 designate D flip-flops, the reference numeral 37 designates a memory and the reference numeral 38 designates a second multiplexer.

The timing reference signal decoder 3 is adapted to receive 8-bit or 10-bit data 1 of a ITU-R BT.601 video signal of the NTSC type and a clock signal 2 of 27 MHz. The timing reference signal decoder 3 detects a timing reference signal from the received 8-bit or 10-bit data 1 in response to the clock signal 2 of 27 MHz to generate signals 5 and 4. The signal 5 is logically one in a horizontal active region and the signal 4 is logically one in a first field.

The 525 counter 8 is adapted to receive the output signal 5 from the timing reference signal decoder 3 at its clock terminal. The 525 counter 8 is operated at a rising edge of the output signal 4 from the timing reference signal decoder 3 to generate a signal 13. Noticeably, it is prescribed in the NTSC that 525 lines constitute one frame. The Moving Picture Expert Group 2 (referred to hereinafter as MPEG-2) prescribes that 480 lines constitute an active region. In this connection, the signal 13 is logically one for an interval of 480 of 525 lines.

The 6 counter 6 is adapted to receive the output signal 4 from the timing reference signal decoder 3 at its clock terminal. The 6 counter 6 is operated to generate a signal 7 which is logically one for an interval of 5 of 6 frames.

The 200 counter 9 is adapted to receive the output signal 7 from the 6 counter 6 at its clock terminal. The 200 counter 6 is operated to generate a signal 12 which is logically one for an interval of one clock or 6 frames.

Noticeably, in the NTSC and PAL, the same active region of 1440 pixels is present in one line. As a result, the horizontal region of video signal can directly be used. An active region of one frame is 576 lines in the PAL, whereas 487 lines in the NTSC. But, 480 lines or 5/6 576 lines are used in the PAL to facilitate hardware implementation. The 6 counter 6 is used to convert 60 Hz of the NTSC into 50 Hz. Namely, the 6 counter 6 is adapted to remove one of 6 frames. In practice, the NTSC signal is not 60 Hz but $60 \times 1000/1001$ Hz. As a result, the frequency conversion can accurately be performed on the basis of the following equation:

$$1001/1000 \times 5/6 = 1001/1200.$$

For hardware implementation, the 6 counter 6 removes one of 6 frames and the 200 counter 9 employs all the 6 frames.

The write address generator 19 is adapted to receive the output signal 5 from the timing reference signal decoder 3, the output signal 13 from the 525 counter 8, the output signal 7 from the 6 counter 6 and the output signal 12 from the 200 counter 9. When the output signal 5 from the timing reference signal decoder 3 and the output signal 13 from the 525 counter 8 are both logically one and the output signal 7 from the 6 counter 6 or the output signal 12 from the 200 counter 9 is logically one, the write address generator 19 is operated to generate a 20-bit address 23, a write enable signal 22 and a chip enable signal 24.

The 1728 counter 11 is operated in response to the clock signal 2 of 27 MHz to generate signals 17 and 18. The signal 17 is logically one for an interval of an active region or 1440 clocks which correspond to the number of pixels of one line in the PAL. The signal 18 is a count value of the 1728 counter 11.

The 625 counter 10 is adapted to receive the output signal 17 from the 1728 counter 11 at its clock terminal. The 625 counter 10 is operated in response to the output signal 17 from the 1728 counter 11 to generate signals 14, 15 and 16. The signal 15 is logically one for an interval of 576 clocks corresponding to an active region of one frame. The signal 14 is logically one for an interval of one clock every 6 clocks when the signal 15 is logically one. The signal 16 is a count value of the 625 counter 10.

The read address generator 20 is adapted to receive the output signals 14 and 15 from the 625 counter 10 and the output signal 17 from the 1728 counter 11. The read address generator 20 repeatedly generates an address of the previous line when the output signal 14 from the 625 counter 10 is logically one. When the output signal 17 from the 1728 counter 11 and the output signal 15 from the 625 counter 10 are both logically one, the read address generator 20 generates a 20-bit address 26, a read enable signal 27 and a chip enable signal 25.

The first multiplexer 31 is adapted to select one of the 20-bit address 23 from the write address generator 19 and the 20-bit address 26 from line read address generator 20 in response to the clock signal 2 of 27 MHz.

The 8-bit D flip-flop 33 has a 3-state function. The 8-bit D flip-flop 33 is adapted to latch the 8-bit or 10-bit data 1 of the ITU-R BT.601 video signal of the NTSC type.

The 8-bit ID flip-flop 35 has a 3-state function. The 8-bit D flip-flop 35 is adapted to latch output data from the memory 37.

The memory 37 is adapted to receive an output signal 32 from the first multiplexer 31 at its address terminal, the write enable signal 22 from the write address generator 19 at its write enable terminal, the read enable signal 27 from the read address generator 20 at its read enable terminal and an output signal 30 from an AND gate at its chip enable terminal. The AND gate ANDS the chip enable signal 24 from the write address generator 19 and the chip enable signal 25 from the read address generator 20 and applies the resultant signal 30 to the chip enable terminal of the memory 37. When the write enable signal 22 from the write address generator 19 is logically zero, the memory 37 stores output data from the D flip-flop 33. On the contrary, when the read enable signal 27 from the read address generator 20 is logically zero, the memory 37 outputs the stored data to the D flip-flop 35.

The timing reference signal generator 21 is adapted to decode the output signal 16 from the 625 counter 10 and the output signal is from the 1725 counter 11 suitably for the PAL manner on the basis of ITU-R BT.601 interface standard (ITU-R BT.656). As a result of the decoding operation, the timing reference signal generator 21 generates signals 28 and 29. The signal 28 is 10 hex in the case of generating a timing reference signal and a luminance component, whereas 80 hex in the case of generating a chrominance component. The signal 29 indicates an inactive region.

The second multiplexer 38 is adapted to select the output data 36 from the memory 37 in an active region and the output signal 28 from the timing reference signal generator 21 in an inactive region in response to the output signal 29 from the timing reference signal generator 21. In result, the second multiplexer 38 outputs a ITU-R BT.601 video signal of the PAL type externally.

As apparent from the above description, according to the present invention, an interfacing operation can be performed between broadcasting equipment for transmitting a ITU-R BT.601 video signal of the NTSC type and broadcasting equipment for receiving a ITU-R BT.601 video signal of the PAL type. In the case where the NTSC/PAL video signal conversion apparatus of the present invention is connected to a digital/PAL encoder, even an analog monitor of the PAL type can receive a digital video signal of the NTSC type. Therefore, the hardware implementation is simplified, resulting in reductions in the cost and the probability of error generation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An NTSC/PAL video signal conversion apparatus employing a ITU-R BT.601 video signal, comprising:

timing reference signal decoding means for detecting a timing reference signal from external input data in response to an external clock signal;

counting means for performing a plurality of counting operations in response to output signals from said timing reference signal decoding means and the external clock signal;

write address generation means for generating a write address, a write enable signal and a chip enable signal in response to output signals from said counting means;

read address generation means for generating a read address, a read enable signal and a chip enable signal in response to the output signals from said counting means;

first multiplexing means for selecting one of the write address from said write address generation means and the read address from said read address generation means in response to the external clock signal;

first latch means for latching the external input data;

memory means for storing output data from said first latch means in response to an output signal from said first multiplexing means, the write enable signal from said write address generation means, the read enable signal from said read address generation means and a signal obtained by ANDing the chip enable signal from said write address generation means and the chip enable signal from said read address generation means;

second latch means for latching output data from said memory means;

timing reference signal generation means for decoding the output signals from said counting means; and second multiplexing means for multiplexing an output signal from said timing reference signal generation means and output data from said second latch means and outputting the resultant signal externally.

2. An NTSC/PAL video signal conversion apparatus employing a ITU-R BT.601 video signal, as set forth in claim 1, wherein said counting means includes:

a first counter for receiving a first output signal from said timing reference signal decoding means at its clock terminal, said first counter being operated at a rising edge of a second output signal from said timing reference signal decoding means to generate its output signal to said write address generation means, the first output signal from said timing reference signal decoding means being logically one in a horizontal active region, the second output signal from said timing reference signal decoding means being logically one in a first field, the output signal from said first counter being logically one in a first active region;

a second counter for receiving the second output signal from said timing reference signal decoding means at its clock terminal, said second counter being operated to generate its output signal to said write address generation means, the output signal from said second counter being logically one for an interval of 5 of 6 frames;

a third counter for receiving the output signal from said second counter at its clock terminal, said third counter being operated to generate its output signal to said write address generation means, the output signal from said third counter being logically one for an interval of 6 frames;

a fourth counter being operated in response to the external clock signal to generate its first and second output signals to said read address generation means and timing reference signal generation means, respectively, the first output signal from said fourth counter being logically one in a second active region, the second output signal from said fourth counter being a count value thereof; and a fifth counter for receiving the first output signal from said fourth counter at its clock terminal, said fifth counter being operated to generate its first and second output signals to said read address generation means and its third output signal to said timing reference signal generation means, the first output signal from said fifth counter being logically one in an active region of one frame, the second output signal from said fifth counter being logically one for an interval of one clock every 6 clocks when the first output signal from said fifth counter is logically one, the third output signal from said fifth counter being a count value thereof.

3. An NTSC/PAL video signal conversion apparatus employing a ITU-R BT.601 video signal, as set forth in claim 2, wherein said timing reference signal decoding means is adapted to detect the timing reference signal from the external input data in response to the external clock signal to generate its first and second output signals, the first output signal from said timing reference signal decoding means being logically one in the horizontal active region, the second output signal from said timing reference signal decoding means being logically one in the first field;

wherein said first counter is adapted to receive the first output signal from said timing reference signal decoding means at its clock terminal, said first counter being operated at the rising edge of the second output signal from said timing reference signal decoding means to generate its output signal which is logically one in the first active region;

wherein said second counter is adapted to receive the second output signal from said timing reference signal decoding means at its clock terminal, said second counter being operated to generate its output signal which is logically one for the interval of 5 of 6 frames;

wherein said third counter is adapted to receive the output signal from said second counter at its clock terminal, said third counter being operated to generate its output signal which is logically one for the interval of 6 frames;

wherein said write address generation means is adapted to generate the write address, the write enable signal and the chip enable signal when the first output signal from said timing reference signal decoding means and the output signal from said first counter are both logically one and the output signal from said second counter or the output signal from said third counter is logically one;

wherein said fourth counter is operated in response to the external clock signal to generate its first and second output signals, the first output signal from said fourth counter being logically one in the second active region, the second output signal from said fourth counter being the count value thereof;

wherein said fifth counter is adapted to receive the first output signal from said fourth counter at its clock terminal, said fifth counter being operated to generate its first to third output signals, the first output signal from said fifth counter being logically one in the active region of one frame, the second output signal from said fifth counter being logically one for the interval of one clock every 6 clocks when the first output signal from said fifth counter is logically one, the third output signal from said fifth counter being the count value thereof;

wherein said read address generation means is adapted to repeatedly generate an address of the previous line when the second output signal from said fifth counter is logically one and to generate the read address, the read enable signal and the chip enable signal when the first output signal from said fourth counter and the first output signal from said fifth counter are both logically one;

wherein said first multiplexing means is adapted to select one of the write address from said write address generation means and the read address from said read address generation means in response to the external clock signal;

wherein said first latch means is adapted to latch the external input data;

wherein said memory means is adapted to receive the output signal from said first multiplexing means at its address terminal, the write enable signal from said write address generation means at its write enable terminal, the read enable signal from said read address generation means at its read enable terminal and the ANDed signal at its chip enable terminal, said memory means storing the output data from said first latch means when the write enable signal from said write address generation means is logically zero and outputting the stored data to said second latch means when the read enable signal from said read address generation means is logically zero;

wherein said second latch means is adapted to latch the output data from said memory means;

wherein said timing reference signal generation means is adapted to decode the third output signal from said fifth counter and the second output signal from said fourth counter to generate a timing reference signal, luminance and chrominance components and an inactive region indicating signal; and wherein said second multiplexing means is adapted to select the output data from said memory means in an active region and the output signal from said timing reference signal generation means in an inactive region in response to the inactive region indicating signal from said timing reference signal generation means and to output the resultant signal externally.

* * * * *